US012630230B2

(12) United States Patent
Shetty et al.

(10) Patent No.: US 12,630,230 B2
(45) Date of Patent: May 19, 2026

(54) MUDFLAP WITH OVERLAPPING INCLINED LOUVERS

(71) Applicant: Volvo Truck Corporation, Gothenburg (SE)

(72) Inventors: Vinayak Shetty, Bangalore (IN); Alokekumar Das, Vadodara (IN)

(73) Assignee: Volvo Truck Corporation, Gothenburg (SE)

( * ) Notice: Subject to any disclaimer, the term of this patent is extended or adjusted under 35 U.S.C. 154(b) by 275 days.

(21) Appl. No.: 18/527,622

(22) Filed: Dec. 4, 2023

(65) Prior Publication Data

US 2024/0182119 A1    Jun. 6, 2024

(30) Foreign Application Priority Data

Dec. 6, 2022    (EP) ..................................... 22211706

(51) Int. Cl.
B62D 25/18        (2006.01)
B62D 35/02        (2006.01)
(52) U.S. Cl.
CPC ............. B62D 25/18 (2013.01); B62D 35/02 (2013.01)
(58) Field of Classification Search
CPC ....... B62D 25/18; B62D 35/02; B62D 25/188
See application file for complete search history.

(56) References Cited

U.S. PATENT DOCUMENTS

| | | | | | |
|---|---|---|---|---|---|
| 2,782,053 | A | * | 2/1957 | Long .................... | B62D 25/188 |
| | | | | | 160/231.1 |
| 3,088,751 | A | * | 5/1963 | Barry ................... | B62D 25/188 |
| | | | | | 280/851 |
| 4,660,846 | A | * | 4/1987 | Morin .................. | B62D 25/188 |
| | | | | | 280/851 |

(Continued)

FOREIGN PATENT DOCUMENTS

| | | | | | |
|---|---|---|---|---|---|
| DE | 102018220900 | A1 | * | 6/2020 | ........... B62D 25/188 |
| FR | 3035369 | A1 | * | 10/2016 | ........... B62D 25/188 |

(Continued)

OTHER PUBLICATIONS

Translated FR-3035369-A1 (Year: 2025).*
Extended European Search Report for European Patent Application No. 22211706.1, mailed May 23, 2023, 9 pages.

*Primary Examiner* — James A Shriver, II
*Assistant Examiner* — Ian Bryce Shelton
(74) *Attorney, Agent, or Firm* — Withrow & Terranova, PLLC

(57)        ABSTRACT

A mudflap for a truck or a trailer, the mudflap comprising a frame, attached to a support in the vehicle, a front side being oriented toward the wheel, and a rear side oriented away from the wheel, the frame having a left upright, a right upright, a top cross member, a bottom cross member, a plurality of louvers, each louver having ends fixedly attached to the left and right uprights, each louver comprising a first louver portion having a leading free edge and a second louver portion, the second louver portion extending (Continued)

from the first louver portion, the first louver portion being inclined with regard to a horizontal direction by a first angle comprised between 40° and 55°, and the second louver portion being inclined with regard to first louver portion by a second angle.

13 Claims, 3 Drawing Sheets

(56) References Cited

U.S. PATENT DOCUMENTS

| | | | | |
|---|---|---|---|---|
| 4,832,356 A * | 5/1989 | Liberto | ................. | B62D 25/168 |
| | | | | 280/851 |
| 4,921,276 A | 5/1990 | Morin | | |
| 5,366,247 A * | 11/1994 | Fischer | ................ | B62D 25/188 |
| | | | | 280/851 |
| 5,564,750 A * | 10/1996 | Bajorek | ............... | B62D 25/188 |
| | | | | 280/848 |
| 6,786,512 B2 * | 9/2004 | Morin | .................. | B62D 25/188 |
| | | | | 280/847 |
| 7,316,420 B2 * | 1/2008 | Loddo | .................. | B62D 25/168 |
| | | | | 280/848 |
| 7,946,531 B2 * | 5/2011 | Jackson | .................. | B64C 25/32 |
| | | | | 244/100 R |
| 8,608,203 B2 * | 12/2013 | Downes | ................. | B62D 25/18 |
| | | | | 280/848 |
| 8,616,571 B2 * | 12/2013 | Smith | .................. | B62D 25/188 |
| | | | | 280/154 |
| 8,777,270 B2 * | 7/2014 | Kim | ...................... | B62D 25/188 |
| | | | | 280/851 |
| 2003/0141713 A1 * | 7/2003 | Morin | .................. | B62D 25/188 |
| | | | | 280/847 |
| 2004/0080185 A1 * | 4/2004 | Loddo | .................. | B62D 25/168 |
| | | | | 296/198 |
| 2012/0112447 A1 * | 5/2012 | Stidsen | ................ | B62D 25/188 |
| | | | | 280/851 |
| 2014/0151993 A1 * | 6/2014 | Kim | ...................... | B62D 25/188 |
| | | | | 280/851 |
| 2020/0262489 A1 | 8/2020 | Morgan et al. | | |
| 2024/0083520 A1 * | 3/2024 | Bradley | .............. | B62D 35/001 |

FOREIGN PATENT DOCUMENTS

| | | | | | |
|---|---|---|---|---|---|
| GB | 2198696 A | * | 6/1988 | ........... | B62D 25/188 |
| GB | 2242876 A | * | 10/1991 | ........... | B62D 25/188 |
| GB | 2300396 A | * | 11/1996 | ........... | B62D 25/188 |
| GB | 2573162 A | * | 10/2019 | ............. | B62D 25/18 |
| JP | 2001219871 A | * | 8/2001 | | |

* cited by examiner

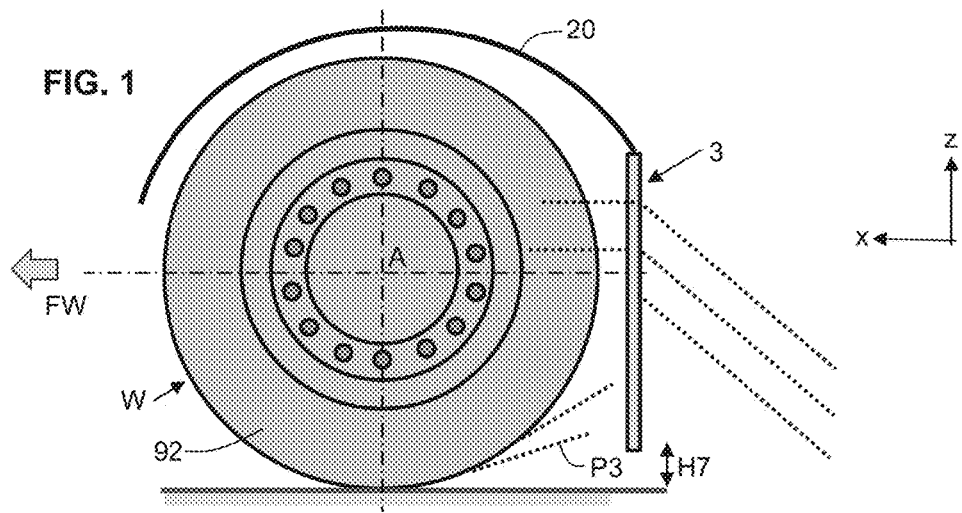
FIG. 1
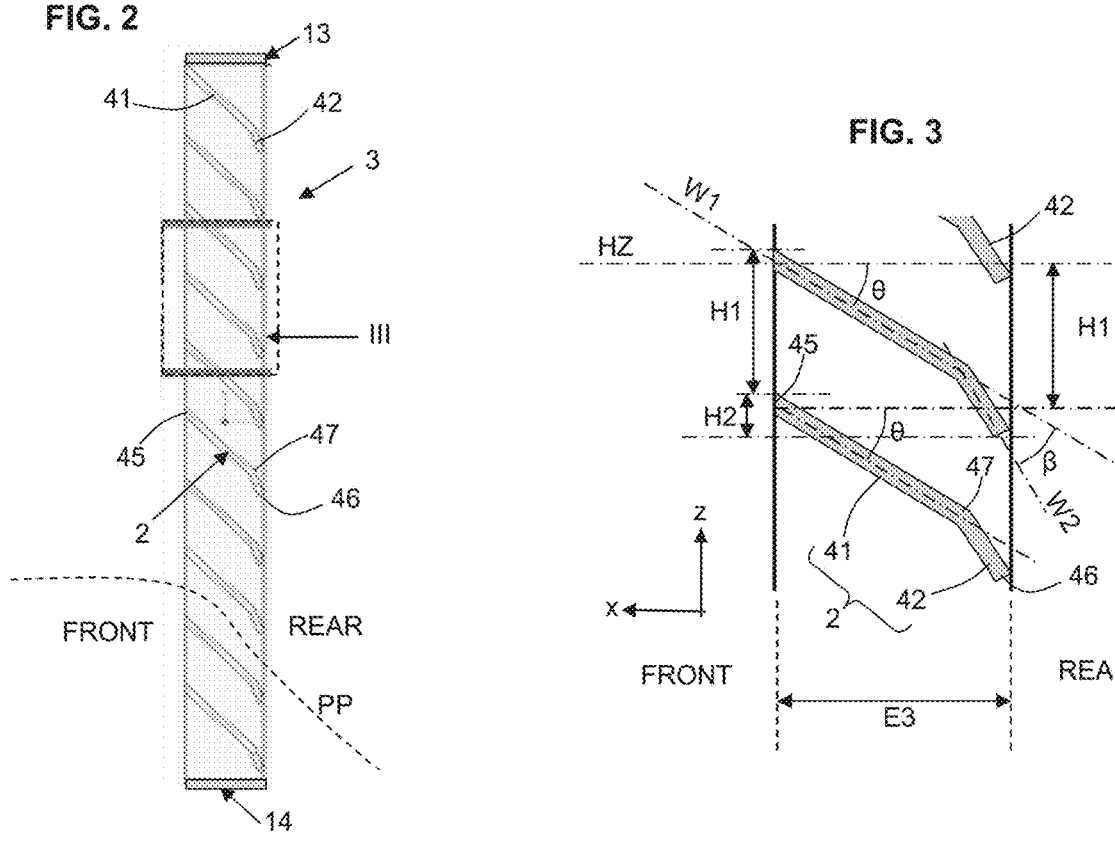
FIG. 2
FIG. 3

MUDFLAP WITH OVERLAPPING INCLINED LOUVERS

PRIORITY APPLICATIONS

The present application claims priority to European Patent Application No. 22211706.1, filed on Dec. 6, 2022, and entitled "MUDFLAP WITH OVERLAPPING INCLINED LOUVERS," which is incorporated herein by reference in its entirety.

FIELD OF THE INVENTION

The present invention relates to wheel mudflaps for trucks and trailers. Such aerodynamic mudflaps are intended for guiding wheel projections down to the ground, thereby preventing a soiling effect to the equipped vehicle and items located in the environment (pedestrians, bikers, other vehicles). More particularly, we pay special attention to the efficiency of directing projections to the ground without affecting much aerodynamic behaviour of such mudflaps and mitigating aerodynamic drag.

BACKGROUND OF THE DISCLOSURE

Mudflaps for trucks, trailers, utility vehicles and the like are known to protect entities located behind the wheels, in the normal direction of transport, against projections of solid particles or liquid droplets. However, installing such mudflaps adversely affect the overall aerodynamic performance of the vehicle.

Various efforts have been made to mitigate the adverse aerodynamic effects of mudflaps, like for example in the teachings of U.S. Pat. No. 5,564,750 or U.S. Pat. No. 3,088,751. However, those examples either let some particles go through straight and/or exhibit a too large aerodynamic drag.

The inventors have found that there remains a need to further improve the compromise between mechanical protection and aerodynamic behaviour.

SUMMARY OF THE DISCLOSURE

According to one aspect, it is provided a mudflap (3) for a vehicle such as a truck or a utility vehicle or a trailer, the mudflap being arranged substantially in a vertical position in a normal use condition, where the mudflap is configured to be attached to a support in the vehicle, a front side being oriented toward the wheel, and a rear side oriented away from the wheel, wherein the mudflap comprises a left upright (11) and a right upright (12), the mudflap comprising:

a plurality of louvers (2), extending substantially horizontally in the normal use condition, each louver having a first longitudinal end (21) fixedly attached to the left upright and a second longitudinal end (22) fixedly attached to the right upright, each louver comprising a first louver portion (41) having a leading free edge (45) at a front side thereof, and a second louver portion (42), the second louver portion (42) extending continuously from the first louver portion, at a rear side of the first louver portion, the second louver portion being delimited by a trailing free edge (46), characterized in that the first louver portion is inclined with regard to a horizontal direction by a first angle ($\theta$), the first angle being comprised between 30° and 65°, and wherein the second louver portion is inclined with regard to first louver portion by a second angle ($\beta$), the second angle being comprised between 5° and 85°.

It should be noted that from the perspective of airflow coming from the front side, first and second louver portions are downwardly oriented, with the second louver portions more downwardly oriented than the first portion. They together deflect downwards air flow and solid particles.

Advantageously, the particular proposed angle ranges prove to be effective as a good tradeoff/compromise between protection of environment and small aerodynamic drag.

Advantageously, the double inclination of the louvers improves the efficiency of the mudflap regarding deviation of solid particles or liquid droplets down to the ground.

In various embodiments of the invention, one may possibly have recourse in addition to one and/or other of the following arrangements, taken alone or in combination.

According to one option, the left upright and the right upright are part of a frame, wherein the frame further comprises a top cross member extending between the left upright and the right upright, and a bottom cross member extending between the left upright and the right upright.

With such arrangement, the louvers are protected from mechanical impact by the frame surrounding the louvers.

According to one option, the louvers are overlapping from a front-rear viewpoint. Thereby, no straight line in the front-rear direction is let free for some projections to be thrown away horizontally in a rear direction. We thereby protect the following vehicles and other road/street users from direct projections.

According to one option, for a couple of adjacent louvers, with one upper louver and one lower louver, the trailing edge of the upper louver is located below the leading edge of the lower louver. This is another way of stating the overlapping function described above. No straight line in the front-rear direction remains free.

According to one option, there is defined a louver overlapping ratio H2/H1, where H1 is a vertical offset distancing two successive louvers, and H2 denotes vertical distance separating the trailing edge of an upper louver and the leading edge of a lower louver; according to this option, the louver overlapping ratio (H2/H1) can be comprised between 5% and 60%, and preferably comprised between 10% and 30%. Advantageously, with such overlap, even inclined particle trajectory is captured by the louvers and is prevented to be thrown far away in straight line behind the mudflap.

According to one option, the louver overlapping ratio (H2/H1) can be comprised between 15% and 20%. This further enhances the tradeoff/compromise between protection of environment and small aerodynamic drag. Airflow is easy and aerodynamic drag is mitigated.

According to one option, the louvers are arranged parallel to each other. The available slot between two successive louvers exhibits a uniform height along the transverse direction. Further, such parallel louvers arrangement is good looking.

According to one option, the number of louvers may be comprised between 2 and 20 and preferably comprised between 8 and 12.

According to one option, two successive louvers are substantially identical and have respective positions distanced by a vertical shift (H1) (offset by H1 distance).

According to one option, the available slot between two successive louvers exhibits a height along the vertical direction, denoted H1-E1, where E1 is a height of the leading edge of the first portion of the louver.

H1-E1 defines the larger size of gravel that can enter the mudflap.

According to one option, the first louver portion (41) can be flat. In addition, the first louver portion can exhibit a uniform thickness. This kind of part is easy to design and cost effective.

According to one option, the first louver portion (41) can be arcuate viewed from the rear direction. The second louver portion (42) can also be arcuate viewed from the rear direction. According to one option, there may be provided a top apex at a middle portion of the louver.

According to one option, the second louver portion (42) can be flat. In addition, the second louver portion can exhibit a uniform thickness. This kind of part is easy to design and cost effective. The second louver portion extends rearwards from the first louver portion in continuity, without any hole or recess in the first and second louver portions.

According to one option, the first and second louver portions exhibit a same thickness for all portions. This provides consistence and robustness, there is no weak area that can be jeopardised or damaged by a gravel impact.

According to one option, regarding the cross section of a louver, there is defined a length of the first portion denoted L41, and a length of the second portion length L42. According to an option, a ratio L42/L41 may be comprised between 0.10 and 0.50. The inventors found that such ratio is beneficial to optimize the overall performance regarding mechanical function of deviating downwards liquid and solid particles together with mitigating aerodynamic drag. According to an option, a ratio L42/L41 may be comprised between 0.15 and 0.30. These respective lengths of each first and second portions give further optimized results.

Further, it should be noted that the dimensions H1, H2, E1, E2, E3, θ, β, L41, L42 are determined by the packaging space available in the mudflap region.

According to one option, all the louvers are identical and aligned vertically. This provides a thin profile.

According to one option, all the louvers are encompassed within a volume defined by the frame. Thereby mudflaps according to this configuration can be stacked one upon the other before assembly on the truck, and the plurality of mudflaps can be stored in a compact space, without risking damaging louvers.

According to one option, the louvers are made of hard polymer material. This is a cost-effective solution.

According to one option, all the louvers and the frame are made of a same material. According to one possibility the mudflap is a monolithic moulded part.

According to one option, the first angle (θ) is comprised between 42° and 46°. This further optimises the overall design and the efficiency.

According to one option, the second angle (β) is comprised between 20° and 40°. This further optimises the overall design and the efficiency.

The second angle (β) can be comprised between 27° and 33°. This further optimizes the overall compromise between deflection efficiency and aerodynamic drag reduction.

According to one option, an overall thickness (E3) of the mudflap along the longitudinal direction is comprised between 20 mm and 40 mm. Advantageously the mudflap exhibits a thin profile and is a light organ.

According to one option, a thickness (E2) of each louver is comprised between 4 mm and 8 mm. This gives a good trade-off between robustness ruggedness and weight.

The present disclosure is also directed to a wheel arrangement for a vehicle such as a truck or a utility vehicle or a trailer, comprising an arcuate wheel cover or a fender and a mudflap as described above.

The present disclosure is also directed to vehicle comprising at least a wheel arrangement as described above.

BRIEF DESCRIPTION OF THE DRAWINGS

Other features and advantages of the invention appear from the following detailed description of one of its embodiments, given by way of non-limiting example, and with reference to the accompanying drawings, in which:

FIG. 1 illustrates a diagrammatic side view of wheel arrangement for a vehicle, with a mudflap in accordance with the present invention.

FIG. 2 is exemplary diagrammatic side section view a first embodiment of a mudflap according to the present invention.

FIG. 3 is exemplary diagrammatic enlarged side section view.

DETAILED DESCRIPTION OF THE DISCLOSURE

Figure 4:
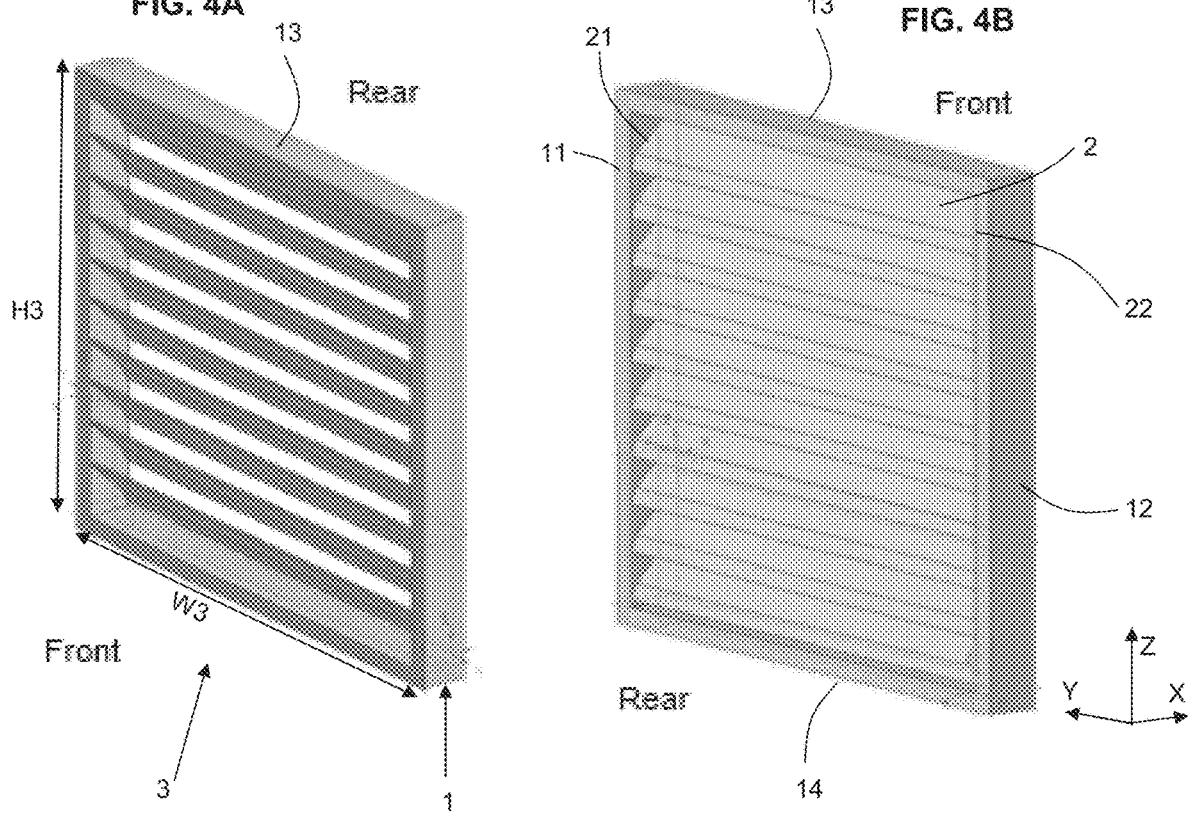
FIGS. 4A and 4B illustrate the mudflap, from a front perspective view and a rear perspective view.

In the figures, the same references denote identical or similar elements.

As apparent from FIG. 1, there is provided a wheel arrangement for a vehicle. The vehicle at stake can be a truck, a bus, a heavy-duty vehicle or a utility vehicle. The vehicle can be a trailer. Generally speaking, the vehicle is a road vehicle. The vehicle can have four wheels, six wheels or any number of wheels.

Now for clarity, we concentrate on one wheel W, but it should be noted that several or all wheels can be equipped with the present invention.

When the vehicle moves, the wheel rotates. The forward direction is denoted FW on FIG. 1. The wheel comprises a tire 92. The tire outer surface can have various superficial shapes including grooves.

When the wheel rotates, the periphery of the tire may project liquid or solid items P3 toward the rear direction. Said liquid or solid items P3 are called wheel projections and may comprise water droplets, mud droplets, gravels, particles, small stones. These wheel projections can entail risk of damage for any following vehicle. The following vehicle can be a truck, a passenger car, a motorcycle, etc . . . .

The wheel projections can also make the following vehicle(s) dirty. The wheel projections can also provoke damages and/or dirt to the vehicle at stake itself. In a semi-trailer configuration, the wheel projections of the tractor can provoke damages and/or dirt to the trailer. The quantity of the wheel projections depends on the local configuration of the road surface. In particular, the quantity of the wheel projections increases with wet and dirt conditions of the road surface. The velocity of the wheel projections increases in relation with the vehicle speed.

Thus, there is provided a mudflap 3. The purpose of the mudflap 3 is to strongly reduce the adverse effects of the wheel projections on the rear portion of the vehicle at stake itself and on the following vehicles.

In the shown example, the wheel arrangement comprises an arcuate wheel cover 20. In the shown example, the arcuate wheel covers the top half of the wheel, i.e. 180° coverage on both sides from the top point. The arcuate wheel cover can also be named 'wheel housing' or 'wheel casing'.

However, such arcuate wheel cover is optional, the mudflap 3 can be attached to a transverse support. The transverse direction is parallel to the wheel axis A, whereas the longitudinal direction X corresponds to front/rear direction (in normal use).

We note here that the commonly used term 'mudguard' can comprise only the mudflap as explained herein or a combination of a mudlfap and an arcuate wheel cover.

In one example, the mudflap extends transversely over the entire width of the tire.

It is not excluded to have, besides the mudflap of interest here, some additional deflector laterally arranged on the outer side of the mudflap, or on both sides of the mudflap.

In use in the wheel arrangement, there is a clearance H7 left between the ground and the bottom and of the mudflap. Of course the clearance H7 depends on the load of the vehicle. In practice H7 can be comprised, according to various applicable regulations, between 20 cm (max load or suspension depressed) and 40 cm (low load). Further, the mudflap is mounted with some flexibility on its support, and therefore if the mudflap hit something on the ground, or hit by a impacting foreign object, it will deflect and thereafter return to this initial position after the deflection.

Frame

The mudflap 3 comprises a frame 1 attached to a support in the vehicle. Such support can be a wheelcover as discussed above, but such support can also be any cross member available close to the wheel.

According to one embodiment, the mudflap is hanging on a support. This hanging arrangement can comprise a pivotal mount or can be a somewhat rigid mount.

The frame 1 comprises a front side being oriented toward the wheel, and a rear side oriented away from the wheel.

The frame 1 has a general rectangular shape. The frame 1 comprises a left upright 11, a right upright 12, a top cross member 13, and a bottom cross member 14.

The left upright 11 and the right upright 12 extend along the vertical direction Z.

The top cross member 13 and the bottom cross member 14 extend along the horizontal direction, transverse Y.

The frame 1 is arranged substantially in a vertical position in a normal use condition.

In the illustrated example, the frame 1 is made of hard thermoplastics like ABS, PP, PA, PVC. In the illustrated example, the frame 1 is monolithic, whereas it is not excluded to have four distinct members assembled together to form the frame.

The dimension of the frame along the longitudinal direction X is denoted E3. E3 is comprised between 20 mm and 40 mm. The mudflap 3 comprises a plurality of louvers 2, which are discussed below. The height H3 of the frame can be comprised between 35 cm and 65 cm The width W3 of the frame can be comprised between 25 cm and 65 cm. The frame can cover a twin wheel configuration.

Louvers

Each louver 2 extends substantially along the horizontal transverse direction Y in the normal use condition.

The number of louvers can be comprised between 2 and 20. In some embodiments, the number of louvers can be comprised between 8 and 12.

Each louver has a first longitudinal end 21 fixedly attached to the left upright 11 and a second longitudinal end 22 fixedly attached to the right upright 12.

Figure 5:
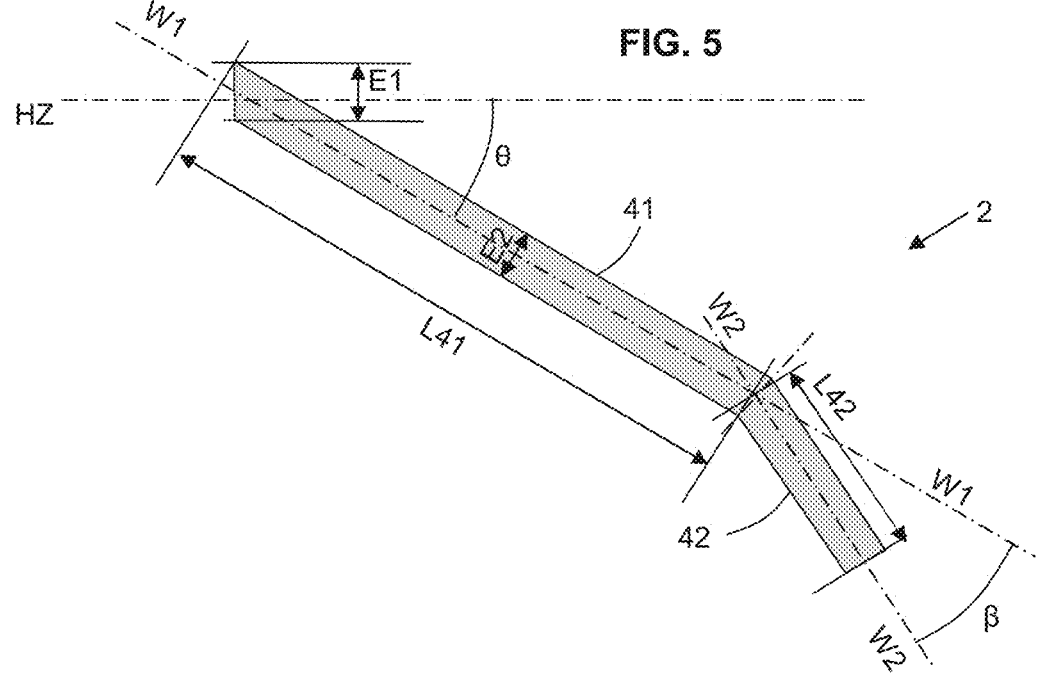
FIG. 5 is an enlarged view that illustrates values geometric feature of one louver included in the mudflap.

Each louver 2 has a cross section which is illustrated in particular at FIG. 3 and FIG. 5.

In the illustrated example, each louver 2 exhibits a constant cross section along Y.

Each louver comprises a first louver portion 41. The first louver portion 41 has a leading free edge 45 at a front side thereof and a back area 47.

Each louver comprises a second louver portion 42. The second louver portion 42 extends continuously from the back area 47 of the first louver portion, at a rear side of the first louver portion. The second louver portion is delimited by a trailing free edge 46 at the rear end.

In the illustrated example, the first louver portion 41 is substantially flat.

In the illustrated example, the second louver portion 42 is substantially flat.

The thickness E2 of each louver portion is comprised between 4 mm and 8 mm. In the shown example, the thickness E2 is constant along the cross section. In other implementations, the thickness E2 could be decreasing along the cross section from front to rear.

Regarding the cross section of a louver, there is defined a length of the first portion denoted L41, and a length of the second portion length L42. A ratio L42/L41 is comprised between 0.15 and 0.30.

All the louvers 2 are identical and aligned vertically.

In the shown example, the louvers are exactly encompassed within the frame; that is, the front end of the louvers coincides with a plane of the front face of the frame, the back end of the louvers coincides with a plane of the back face of the frame.

The louvers are made of hard polymer material. More precisely each louver can be made of hard thermoplastics like ABS, PP, PA, PVC.

Given the material used to manufacture the mudflap, the mudflap exhibits a fixed geometry with few possibility of flexing under stress.

Inclination of Louver Portions

We take as reference a plane of the front face of the frame, and a normal direction denoted X, which coincides with a horizontal direction when the frame is in a vertical position.

The first louver portion 41 is inclined with regard to a horizontal direction X by a first angle $\theta$. The first angle $\theta$ is generally comprised between 30° and 65°. In some embodiments, the first angle $\theta$ is comprised between 40° and 55°.

Said otherwise, the primitive direction W1 of the first louver portion, taken at mid thickness, deviates from X by first angle $\theta$.

The second louver portion is inclined with regard to first louver portion by a second angle $\beta$. The second angle $\beta$ is comprised between 5° and 85°.

Said otherwise, the primitive direction W2 of the second louver portion, taken a mid thickness, deviates from W1 by first angle $\beta$.

According to some preferred configuration, the first angle $\theta$ can be comprised between 42° and 46°. According to some preferred configuration, the second angle $\beta$ can be comprised between 20° and 40°. The second angle $\beta$ can be comprised between 27° and 33°.

Passages for Airflow and Particles.

As depicted at FIG. 2, airflow coming from the front area can pass through the mudflap with minimal drag, also being deviated downwards. This is illustrated by a path PP at FIG. 2. Regarding solid particle, they bounce on the louvers and come down to the ground in downwards direction.

The distance HZ separating two primitive directions of two respective successive louvers along the vertical direction Z has the same value as per H1. HZ is a vertical offset distancing two neighboring louver.

Figure 6:
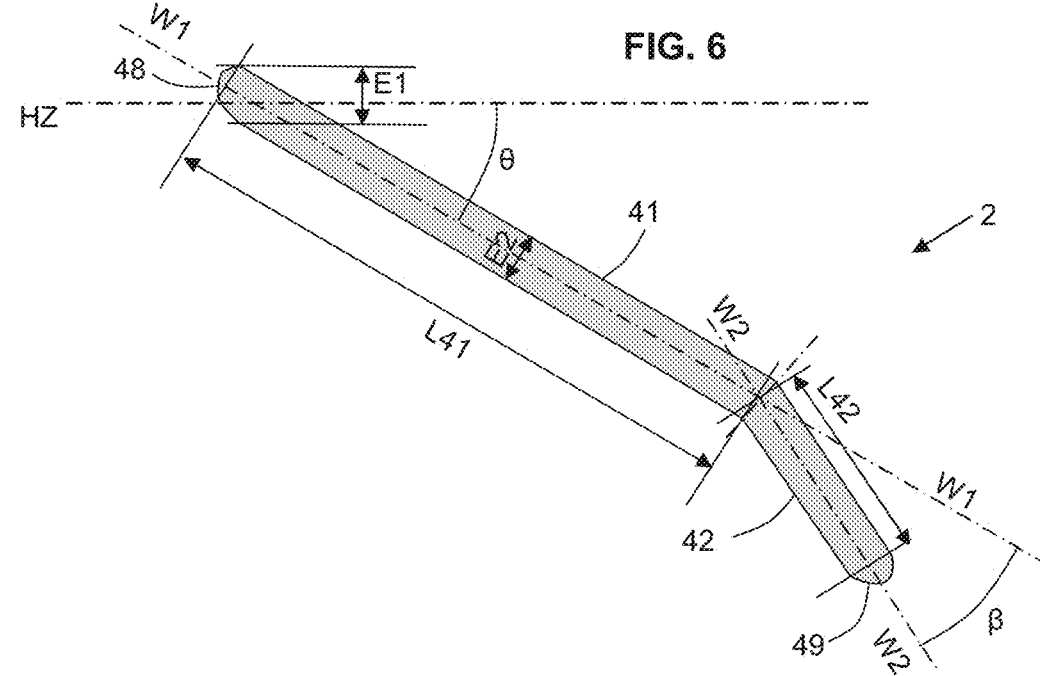
FIG. 6 is an enlarged view that illustrates values geometric feature of another louver type included in the mudflap.

Turning now to FIG. 6, there may be provided rounded end 48 at the leading edge of the first louvre portion, a sharp edge is therefore avoided. Similarly, there may be provided rounded end 49 at the trailing edge of the second louvre portion 42, a sharp edge is therefore avoided. This kind of end shape can help mitigating a possible air borne noise.

The dimensions H1, H2, E1, E2, E3, θ, β, L41, L42 is determined by the packaging space available in the mudflap region.

Generally speaking, the mudflap can be a separate part or not. A separate part is distinct from other parts, with a frame and louvers as exemplified FIGS. 4A and 4B.

However, the mudflap can be part of a larger part having possibly other functionalities. Indeed, instead of being encompassed within a frame, the louvers can be supported in a part of the vehicle having grooves or slots to receive the louvers therein.

The invention claimed is:

1. A mudflap for a vehicle, the mudflap being arranged substantially in a vertical position in a normal use condition, where the mudflap is configured to be attached to a support in the vehicle, a front side being oriented toward a wheel, and a rear side oriented away from the wheel;

wherein the mudflap comprises a left upright and a right upright;

wherein the mudflap comprises:

a plurality of louvers, extending substantially horizontally in the normal use condition;

each louver having a first longitudinal end fixedly attached to the left upright and a second longitudinal end fixedly attached to the right upright;

each louver comprising a first louver portion having a leading free edge at a front side thereof, and a second louver portion, the second louver portion extending continuously from the first louver portion, at a rear side of the first louver portion, the second louver portion being delimited by a trailing free edge;

wherein the first louver portion is inclined with regard to a horizontal direction by a first angle, the first angle being comprised between 30° and 65°;

wherein the second louver portion is inclined with regard to the first louver portion by a second angle, the second angle being comprised between 5° and 85°; and wherein for a couple of adjacent louvers, with one upper louver and one lower louver, the trailing free edge of the upper louver is located below the leading free edge of the lower louver, and wherein the mudflap exhibits a louver overlapping ratio H2/H1 comprised between 10% and 30%, where H1 is a vertical offset distancing the upper louver and the lower louver of the couple of adjacent louvers, and H2 denotes a vertical distance separating the trailing free edge of the upper louver and the leading free edge of the lower louver.

2. The mudflap of claim 1, wherein the left upright and the right upright are part of a frame, wherein the frame further comprises a top cross member extending between the left upright and the right upright, and a bottom cross member extending between the left upright and the right upright.

3. The mudflap of claim 1, wherein the louvers are arranged parallel to each other.

4. The mudflap of claim 1, wherein the first louver portion is flat.

5. The mudflap of claim 1, wherein the second louver portion is flat.

6. The mudflap of claim 1, wherein there is defined regarding the cross section of a louver, a length of the first louver portion, and a length of the second louver portion length, and wherein the ratio between length of the second louver portion and the length of the first louver portion is comprised between 0.15 and 0.30.

7. The mudflap of claim 1, wherein all the louvers are identical and aligned vertically.

8. The mudflap of claim 1, wherein the first angle is comprised between 42° and 46°.

9. The mudflap of claim 1, wherein the second angle is comprised between 20° and 40°.

10. The mudflap of claim 1, wherein an overall thickness of the mudflap along the longitudinal direction is comprised between 20 mm and 40 mm.

11. The mudflap of claim 1, wherein a thickness of each louver is comprised between 4 mm and 8 mm.

12. A wheel arrangement for a vehicle, comprising:

an arcuate wheel cover or a fender; and the mudflap of claim 1.

13. A vehicle comprising at least the wheel arrangement of claim 12.

* * * * *